United States Patent Office 2,792,923
Patented May 21, 1957

2,792,923

CONVEYOR DEVICES FOR LOOSE MATERIAL

Heinrich Frauböse, Brambauer, and Fritz Dittmer, Essen, Germany, assignors to Heinrich Koppers Gesellschaft mit beschrankter Haftung, Essen, Germany Application November 10, 1953, Serial No. 391,323

6 Claims. (Cl. 198—37)

The invention relates to conveyor devices for loose material which is delivered from different bunkers containing material of different grain sizes on to a common conveyor by means of individual conveyors arranged under them and moved by drives coupled with one another.

The accuracy of a particular mixing proportion of different loose materials is in many cases of considerable importance with respect to the final product to be made from the mixture. This is the case for example in the mixing of coals of different origins to be used for coking in a coke oven. If the mixing proportion required for the desired good coke is not maintained exactly, then a less satisfactory coke may be produced, and under some conditions there may result a swelling action in the oven which may destroy the chambers of the oven. If the loose material which is to be mixed is drawn from a number of bunkers containing different sorts, then by always drawing off a uniform amount from all bunkers, which can be done by coupling the drive of the single draw-off devices, there is ensured a uniform mixing ratio so long as the bunkers for the individual sorts are always filled with loose material, i. e. no single one of them becomes empty.

The task of the invention is, in general to produce an arrangement by which the failure of the supply of material to any one or more of the different conveyors, or a reduction in the supply of material below the prescribed amount, automatically stops the drive of the motor or motors which are still conveying material, and after the supply of material is again restored sets them in action again automatically. In this way the exact equal mixing proportion is always maintained automatically, by a level indicator in the form of a double lever formed as a swinging flap which is under the influence of the conveyed material and actuates an electrical switch when the supply of material fails.

Each of the swinging flap switches is arranged in a control circuit in which is a relay, controlling a further control circuit, which on the opening of one or more swinging flap switches as the result of failure of the supply of material to the corresponding conveyor belt closes this further control circuit, whereby the circuits of all driving motors are broken by means of relays arranged individual to each driving motor.

According to the invention the swinging flap switches have a second contact which, on the failure of the supply of material to the individual conveyors, close a shunt circuit of the motor relay through the corresponding swinging flap switch or switches of conveyors which no longer convey material, so that the corresponding motor circuit or circuits remain closed and continue to drive these conveyors while the circuits of the driving motors which are still conveying material remain switched off to stop the drive of these conveyors.

According to a further characteristic of the invention the driving motors of the individual conveyors have motor protection switches, the relays of which switch off the corresponding motor on operation of the short circuit fuses or of the thermal cut-out, whereby the motor relays of all driving motors are switched off by means of an auxiliary contact therefor.

A characteristic of the invention is also the arrangement of a signal circuit in all the motor protection switches, which is closed on failure of the motor.

A further characteristic of the invention is the arrangement of a time relay to prevent fluttering of the cut-out switches on the switching in of the driving motors, whereby a short-period delay in the closing of the circuit of the auxiliary contacts controlling the motor relays of the motor protection switch results.

An object of the invention is also the arrangement of an unlocking switch common for all driving motors, by which the swinging flap circuit, the unlocking circuit and the signal circuit can be broken so that any desired driving motor can be actuated by hand.

According to the invention there can be used in place of the swinging flap a photo cell which is acted on by a light ray when the height of the layer on the conveyor belt is less than a predetermined amount, whereupon the photo cell relay actuates the switch.

Finally, a further object of the invention is to construct the swinging flap, which is influenced by the material lying on the conveyor belt and actuates the switch, so that the arm lying on the material is jointed, and to hold it in the required position by the pull of a spring, in order to make possible a movement of the flap out of the way in the event of any sudden deposition of the material above the prescribed layer height. According to the invention the swinging flap is adjustable in height to adapt it to the required layer height of the conveyor belt.

The invention is shown diagrammatically in the diagrams in a preferred constructional form.

Fig. 1 shows the lower part of a bunker in vertical section with the swinging flap arranged above the conveyor.

Fig. 3 is a diagram of a switching scheme with the the lower parts of three different bunkers for three different sorts of material.

Figure 2:
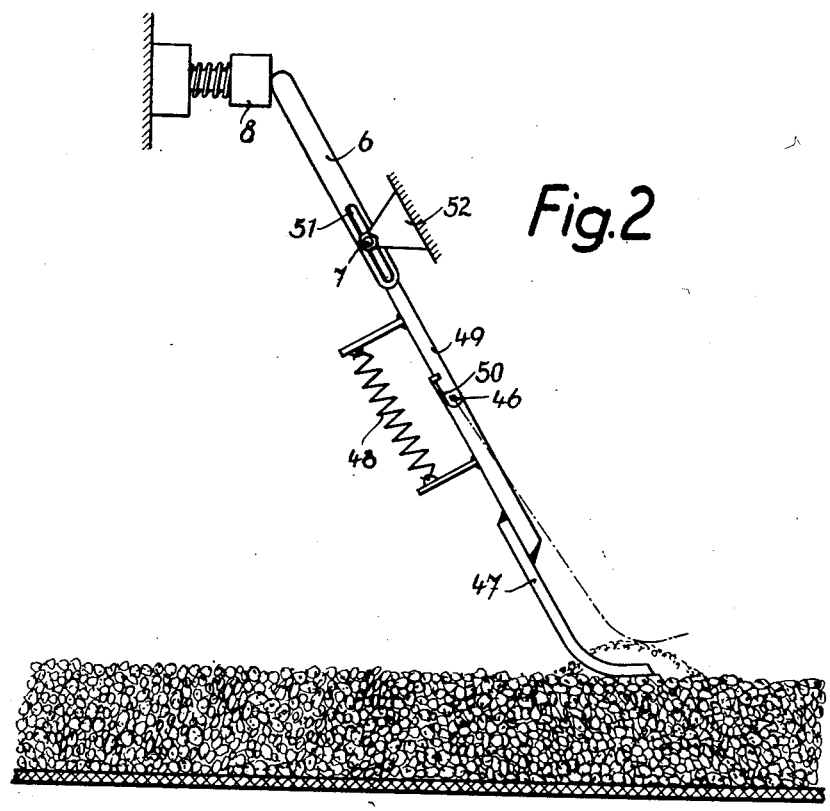
Fig. 2 is a swinging flap on a larger scale.

Below each bunker, marked 1, 2, 3, are arranged conveyor belts 4 which are driven by a driving motor shown at 20, 21, 22, in the diagram and which can have any suitable length. The conveyor belts 4 convey the material coming out of the bunkers to a conveyor belt 5 running at right angles.

Above each conveyor belt 4 is a swinging flap 6 carried on a fixed pivot point 7. As is seen from Fig. 1, the swinging flap 6 lies with its upper arm against a switch 8 when the conveyor belt 4 is conveying material with a correctly corresponding height of layer. Thereby the lower arm of the swinging flap 7 is raised and the switch 8 is actuated to closed position. As seen from Fig. 3, when the material is being conveyed as intended by means of the single conveyor belts 4, the switch 8 of each individual bunker 1, 2, 3 for the different sorts is in such a position that it closes the phases 9, 10 of a circuit which passes through all the switches 8 of the individual bunkers in series and is taken off the main "circuit" of inlet and outlet lead lines of a power source indicated as conventionally by a single heavy line 11.

Each switch 8 is formed so that, when they close their circuit 9, 10 by the proper conveying of all conveyor belts 4, a circuit 12 of each of the switches 8 is broken and when any conveyor belt 4 has an improper level of material, circuit 9, 10, opens and circuit 12 closes. On the closing of the circuit 9, 10 the current of the wire 10 flows through a relay 13, the switch 14 of which is thereby held opened. Thereby a circuit consisting of the wires 15, 16 is also broken, this closing the contacts 19' of the relay 17 of a circuit 18, which in the unenergised position closes these contacts 19' of a circuit 27, 28 passing through the coils 26 of a motor protection relay 24 for each driving motor 20, 21, 22.

The driving motors 20, 21, 22 also obtain current from the main circuit 11 by means of a main circuit branch 23 also shown as a heavy line to connote a "circuit". In the branch circuit 23 of each driving motor are contacts 25 of the motor protection relays 24, which are shunted when all the belts 4 convey material at the prescribed height of layer. In this case the coil 26 of the motor protection relay 24 holds closed the motor circuit 23, since current flows through the wire 27, 28 by way of the contact of the switch 19' which closes the circuit 12 of the swinging flap switch.

If now, in the event of a failure of the supply of the material from one of the bunkers to the corresponding conveyor belt 4 for example out of bunker 3, the swinging flap 6 falls about pivot 7, then the circuit 9, 10 is broken and the circuit 12 is closed by a contact 29. Thereby the relay 13 of the circuit 9, 10 is without current, whereby the contact 14 closes, to close at the same time the circuit 15, 16, 18 connected to the circuit 9, 10 in front of this contact 14 so that all of the motor relays 17 are under voltage and the contacts 19 close and contacts 19' open. The relays 17 therefore break the circuits 27, 28 of all motors. By this closing of the back contacts 29 of the switch 8 of the bunker 3 which has failed in the delivery of material, the corresponding circuit 12 is simultaneously closed, as current from the wire 27 flows now through the shunting wire 12 to the wire 28. Therewith the coil 26 of the motor protection relay 24 of the motor 20 continues to receive current, so that switching off of the motor 20 for belt 4 can not result. The motors 21, 22 of the bunkers 1, 2 which are still delivering material remain switched off however, since with them their circuits 12 do not cause any shunting of the circuit 27, 28 owing to the non-actuation of the back contact 29, since their flaps 6 are still urged to closing position with circuit 9, 10, to which position their relays 17 are energized opening contact 19' and closing contacts 19. Hence, current cannot flow to relays 26 to hold their contacts 25 closed, since both contacts 19' and 29 are now both open.

If the bunker 3, the supply of which has been interrupted, again delivers material to the belt, the swinging flap 6 lifts again and moves the switch 8 in the original position so that the circuit 9, 10 is again closed at that point and the relay 13 again receives current, and the contact 14 is again drawn away to again interrupt the flow of current through the circuit 15, 16 and wires 18 of all motors 20, 21, 22, so that the contacts 19' of the corresponding relays 17 fall in their circuits 27, 28, so that the corresponding coils 26 receive current, whereby the contacts 25 of the relays 24 of the switched-off motors 21, 22 again come into the position shown on the drawings and close their motor circuits.

As may be seen from the diagram, it does not matter whether material is lacking from one or the other or from more than one of the bunkers, since in any such case the conveyor belts 4 which serve a bunker still having material thereon are stopped when there is a belt that is improperly loaded. The loaded conveyor belts 4 run again when the belt or belts which were not conveying any material are again loaded.

Each motor 20, 21, 22 has also a thermo switch 33, the usual main cut-out 34, and fuse 35 of the circuit 27, 28. With a short-circuit through these leads whereby when one or more leads fail from burning out of the corresponding fuses, or with excessive heating of the motor whereby the contacts of the thermo switch 35 break the lead 28, then the corresponding motor, for example the motor 21, stops. Thereby the contact 25 cuts out because there is no current in the coil 26. A contact 30 of the motor protection relay switch 24 closes a line 36, whereby the circut 15, 16 is shunted, so that all the relays 17 then obtain current through the wire 18 by way of lines 15, 16', and are energized to cut off the current from the motors by attracting the corresponding contacts 19, 19' of the motor protection relay switches 24. Thereby all relays 26 are de-energized opening all contacts 25, so that all motors 20, 21, 22 stop. Simultaneously a signal circuit is closed, this consisting of the wires 37, 38, whereby the line 37 is connected through the closed contact 53 of the individual motor protection switches 24 and the wire 36 with the wires 16' and 10, and the line 38 is connected with the wire 9 of the circuit connected to the main circuit 11. Thereby an optical and acoustic signal comes into operation: this may be arranged at various locations according to the dimensions of the plant.

By means of a release switch 32 the coupling of the motors can be cut out so that each motor can be operated individually by hand in case this should be necessary for any reason. By this release switch, the circuit 12 of each motor switch is broken, so that the circuit 27, 28 can be closed by a press switch 39 and can be broken by a press switch 40. Connected with this release switch 32 is a contact 41 through which the line 37 of the signal circuit can also be broken.

In order to avoid, when switching on the whole plant by the main starting switch 42, fluttering of the corresponding cut-outs in consequence of the simultaneous supply of current to the main relay 13 and the individual motor relays 17, there is arranged in the line 16' a contact 44 influenced from a time relay 45, which first pulls up the contact 44 and after a short pause of 1–2 seconds again letting it fall. During this short break of the line 16' the relay 13, which is under current, has pulled up its contact 14, so that now the breaking of the phase 16 is complete and the motor relays 17 remain without current.

As is seen from Fig. 2, the lower arm of the swinging flap 6 has a pivotal joint 46 by which the bent part 47 of the lower arm which rubs on the material on the conveyor belt can move out of the way in the event of piling up of the material. This part 47 is held by a spring 48 in the proper running position with respect to the other abutting part 49 of the lower arm 47. A stop 50 on the lower part 47 of the lower arm thereby comes against the upper part 49 of the lower arm, so that in case of a failure of a sufficient depth of the material on the conveyor belt 4 both parts 47, 49 of the lower swinging flap arm fall down by their own weight and cause a release of the switch 8 to open circuit 9, 10, and close circuit 12 at 29. The swinging flap 6 has its joint 7 adjustable for height in a slot 51 of the fixed bearing 52 in order to give an adjustment of the swinging flap to allow for an adjustment in the desired height of the material, corresponding to the mixing proportions, on the conveyor belt.

We claim:

1. A conveyor device for different bunkers with separate conveyors feeding from the bunkers to a common conveyor, and each moved by individual drives, which are coupled with one another, and equipped with level control means responsive to failure of supply of a definite level on any of each of the separate conveyors to stop the drive of the others, and start the drives up again after restoration of the definite level, said level control means comprising a level indicator for each conveyor, individual switches therefor, and switches in a control circuit having a relay, a closable switch in a further control circuit operable to closed position by the relay in the control circuit, on opening of one or more of the switches for the level indicators as a result of failure of a predetermined level of material on the conveyors, relays for each conveyor operable by said closing of the further control circuit, individual driving motor circuits with individual driving motors for the individual conveyors, said driving motor circuits being breakable individually by the aforesaid relays for their corresponding conveyor on closure of said further control circuit, said individual switches each comprising a second contact in a shunt circuit by which the level indicators for the switches serve to switch in a shunt circuit, so that the corresponding driving motor circuits for each conveyor remain closed while the other driving motor circuits remain open when each switch is operated by its indicator; characterized by the arrangement with each of the driving motor circuits of a motor protection switch with a coil which, in response to shortening of a short circuit fuse and a thermal protection element in the driving motor circuit, switches off the driving motor in conjunction with an auxiliary contact whereby the further control circuit of the motors is shunted to energize its release to break all of the driving motor circuits.

2. A conveyor device as claimed in claim 1 and further characterized by the motor protection switches being interconnected in a signal circuit which is closed by the protection switches while they are switching out all of the driving motors.

3. A conveyor device as claimed in claim 1 and further characterized by a time relay arranged in the further control circuit to close this further control circuit with a short delay when the plant is first switched on.

4. A conveyor device as claimed in claim 2 and further characterized by the control circuit, the shunting circuits and the signal circuit being disconnectible by a common release switch, and by each driving motor being operable by hand as desired.

5. A conveyor device as claimed in claim 1 and further characterized by the level indicator, each comprising a swing flap with a lower arm, having a part, held by a pull spring, which can move against the action of the spring out of the way of material, which may pile up on the conveyor belt above a preset minimum level.

6. A conveyor device for different bunkers with separate conveyors feeding from the bunkers to a common conveyor and each moved by individual drives, which are coupled with one another and equipped with level control means responsive to failure of supply of a definite level on any of each of the separate conveyors to stop the drive of the others and start the drives up again after the restoration of a definite level and a level indicator for each of the conveyors for operating the level control means, said level indicators each comprising a swing flap with a lower arm having a part held by a pull spring, which can move against the action of the spring out of the way of material, which may pile up on the conveyor above a preset minimum level.

References Cited in the file of this patent

UNITED STATES PATENTS

| | | |
|---|---|---|
| 1,259,524 | Kelly | Mar. 19, 1918 |
| 1,601,811 | Church | Oct. 5, 1926 |
| 2,289,186 | Flint | July 7, 1942 |
| 2,510,163 | Wood | June 6, 1950 |
| 2,574,520 | Wood | Nov. 13, 1951 |
| 2,645,300 | Stephenson | July 14, 1953 |